Aug. 16, 1960 M. BÖHLER 2,949,286
CONTINUOUS DRYING KILN FOR SHEATHED WELDING ELECTRODES
Filed May 6, 1957 9 Sheets-Sheet 1
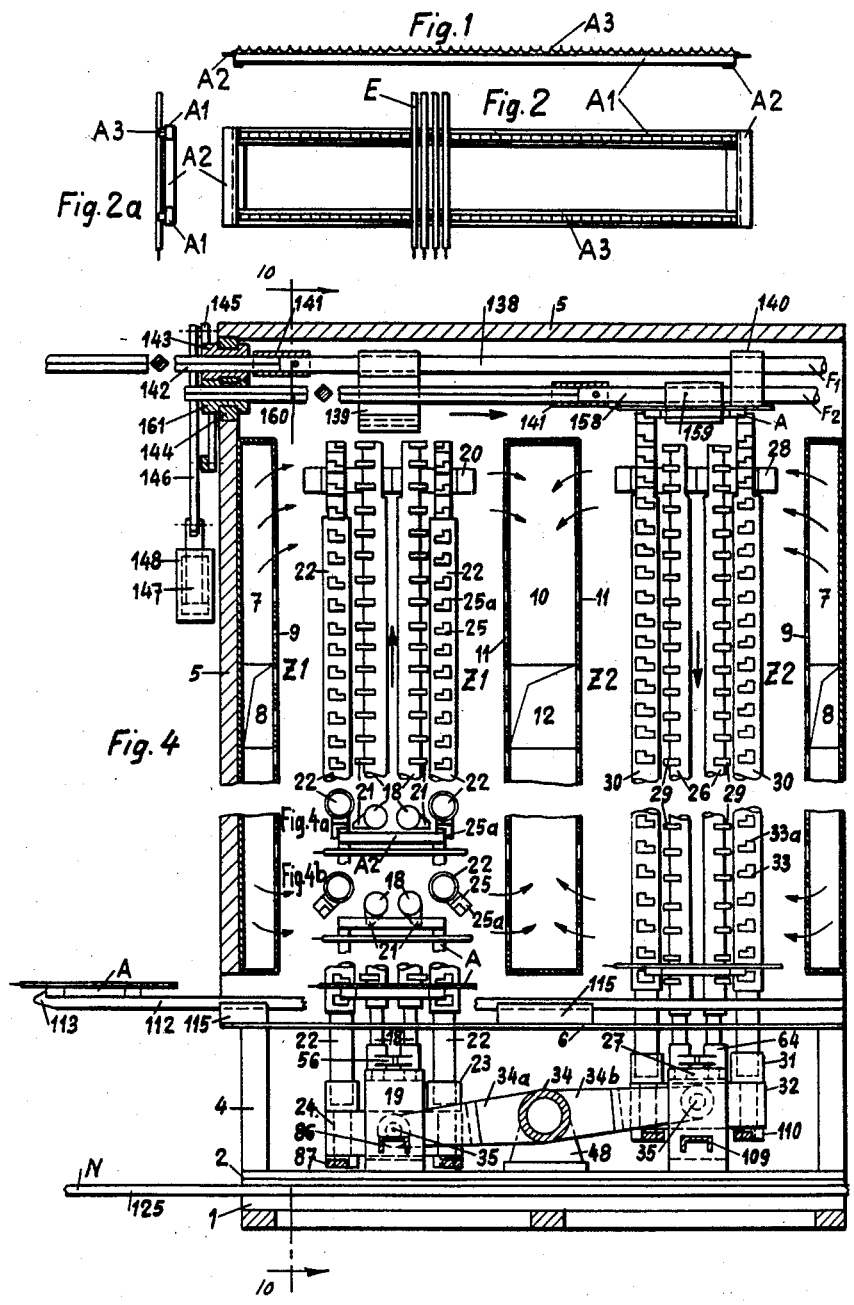
INVENTOR.
MAX BÖHLER

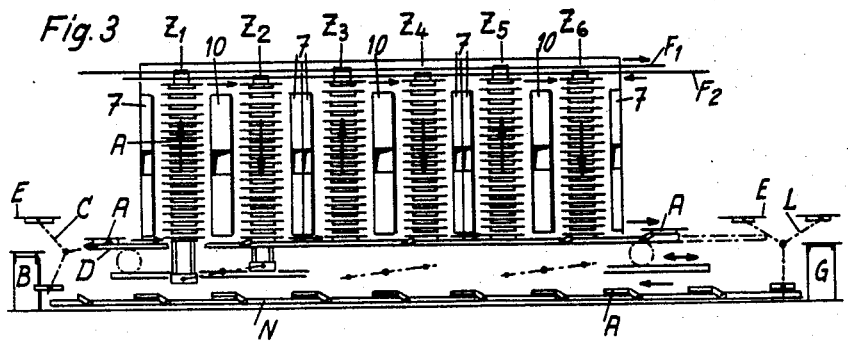
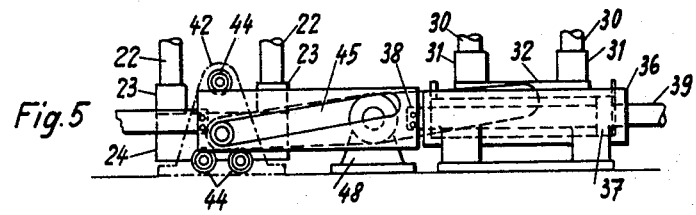
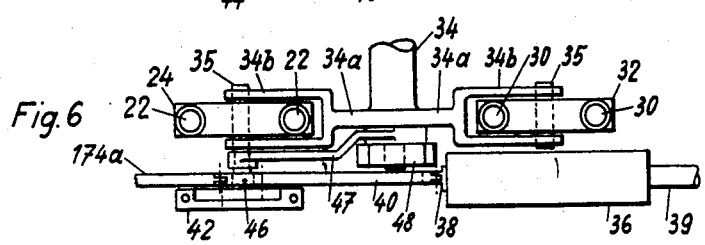
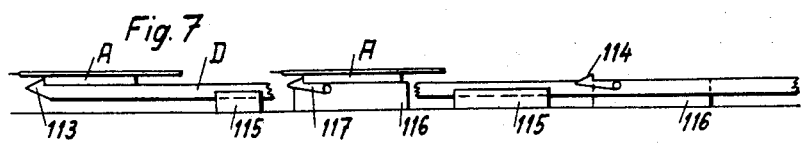

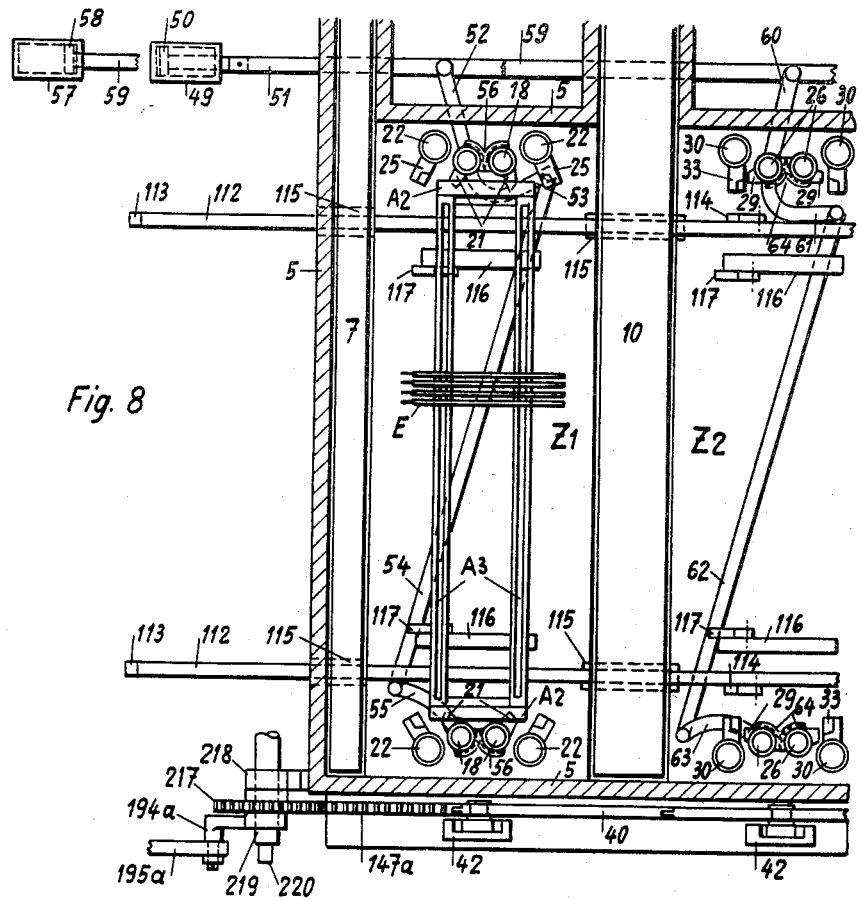

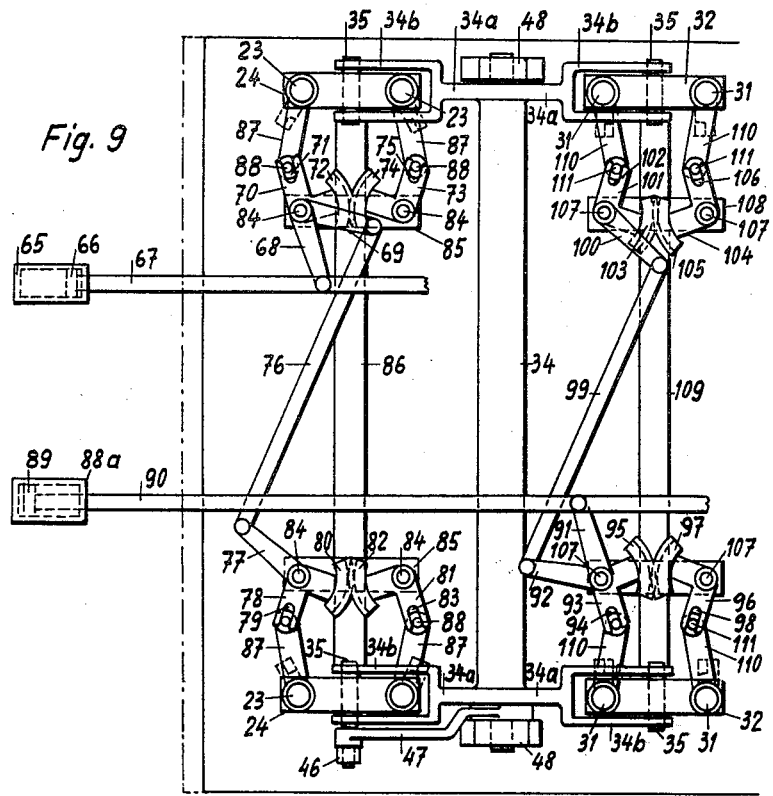

Aug. 16, 1960     M. BÖHLER     2,949,286
CONTINUOUS DRYING KILN FOR SHEATHED WELDING ELECTRODES
Filed May 6, 1957     9 Sheets-Sheet 5

INVENTOR.
MAX BÖHLER
BY

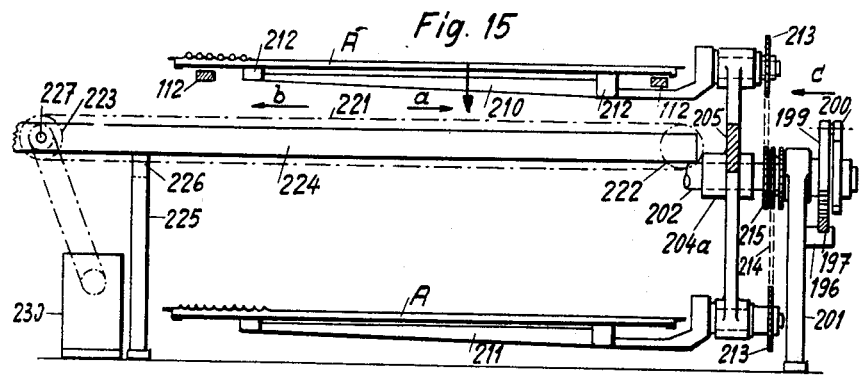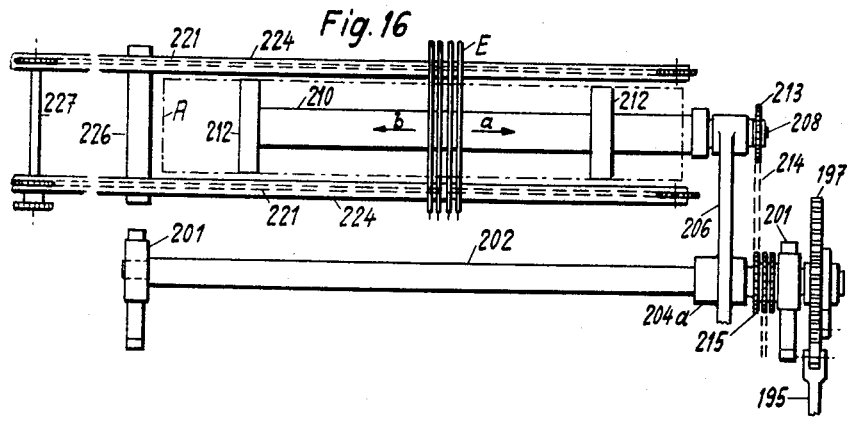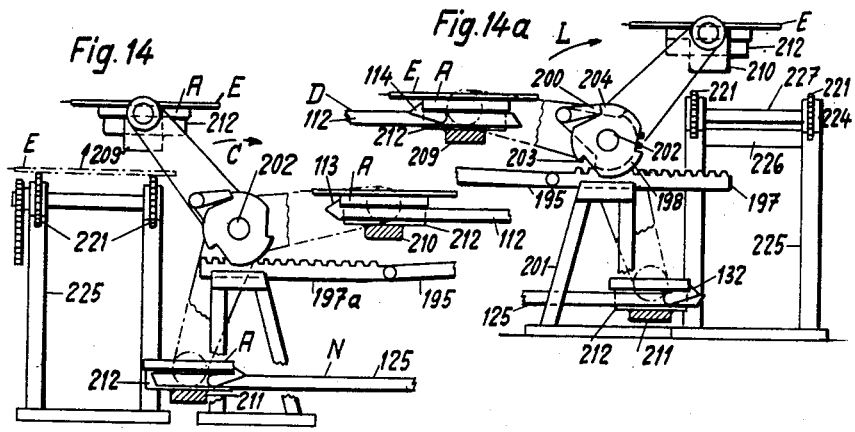

United States Patent Office 2,949,286
Patented Aug. 16, 1960

2,949,286

CONTINUOUS DRYING KILN FOR SHEATHED WELDING ELECTRODES

Max Böhler, Zurich, Switzerland, assignor to Werkzeugmaschinenfabrik Oerlikon Bührle & Co., Abt. Elektrodenfabrik, Zurich, Switzerland, a company of Switzerland and F. J. Ballard and Company Limited, Tividale, Tipton (Staffb), Great Britain, a company of Great Britain Filed May 6, 1957, Ser. No. 657,146

Claims priority, application Switzerland May 4, 1957

5 Claims. (Cl. 263—36)

The present invention relates to a continuous drying kiln for sheathed welding electrodes.

Continuous drying kilns for sheathed electrodes are known. The conveying means employed are link chains on which the electrodes directly rest. Such continuous kilns can be divided into three basic types differing from one another.

The first type has two endless chains horizontally travelling through the heating chamber of the drying kiln. Drivers arranged on the chain links or recesses in the links themselves prevent the electrodes from contacting one another. This simplest type of a continuous kiln, however, is fairly limited in application as very long drying paths and chain lengths are required for comparatively small outputs (e.g. electrode throughput 500 per minute; chain pitch ½″, required drying time assumed as 20 minutes: this would result in a drying path of 127 m.). The outputs obtained with present-day machines are in the vicinity of 1000 and more electrodes per minute.

The second type is based on the same principle, the required chain length being distributed over several horizontally arranged levels. This enables the individual pairs of chains and the entire kiln to be made shorter and the volumetric efficiency (drying path per unit space) to become substantially better than with the first mentioned type. As the electrodes pass through the kiln on more than one level, devices must be provided at one end of the kiln for the transfer of the electrodes from one pair of chains to the next following. Where the rates of transit are high, such transferring devices are required to operate so rapidly that reliable operation is no longer ensured. Also sensitive sheathing compounds may be damaged by indentations caused during such transfer.

Both the aforesaid types display the following disadvantages: The pitch of the chains or the spaces between the drivers arranged on the chains definitely determine the maximum admissible outer diameter of the electrodes. If the pitch is small, the kiln will be small but limited to small electrode diameters. Where the pitch is larger, not only the range of application but the outer dimensions of the continuous kiln and the quantity of material required therefor are increased.

Where one driver is missing or falls out or where a single chain link jams, break-downs may occur. Since a kiln of medium output is equipped with 10,000 to 20,000 drivers and the same number of chain links, which are subject to continually changing temperatures, the break-downs caused by these members may be quite considerable.

In the third type, the drivers separating the electrodes from one another are dispensed with; the electrodes are allowed to pass the kiln in direct contact with one another and frequently in several layers. The absence of drivers saves the spaces between the electrodes and the conveying means from one level to the next are simplified since transfer is effected, not individually but mostly in batches comprising a substantial number, by means of dredge chain-like conveying means. The chain pitch may be selected at will since it does no longer affect the degree of admission. This kiln type is mechanically more dependable in operation but has the great disadvantage that the electrodes are in contact horizontally and vertically so that they are no longer in direct contact with the drying air where they engage. Even drying is impossible in all cases, and sheathing compounds are known which develop cracks and/or swellings when drying is uneven. Also sheathing compounds are today applied which adhere upon mutual contact so that they cannot be separated without being damaged. The application of this type of kiln is therefore limited to a few insensitive sheathing compounds.

The present invention has for its object to provide means eliminating the drawbacks of the known art and to provide a continuous drying kiln which, despite its smaller space requirements, handles a larger output than kilns of known design. The present invention is characterized by the fact that the transport of the electrode rods through the drying kiln is performed by conveying frames independently of one another, which carry the said electrode rods, and that the kiln is composed of a number of chambers arranged in series through which air passes, the said chambers comprising each two cells of which the first cell in the direction of transport is equipped with a device for stacking the frames while the second cell is provided with a device for removing frames from the stack, that the kiln is further equipped with not less than three superposed horizontal pushers operating in the horizontal direction, of which the center pusher conveys the frames into the kiln, and, in the kiln, from one chamber to the next, and out of the kiln, while at least one pusher removes the top frame within the chambers from the rising stack to place it to the descending stack, and the bottom pusher returns the empty frames from the kiln outlet to the kiln inlet.

An embodiment of the invention is illustrated, by way of example, in the attached drawing, in which:

Fig. 1 is a side view of a carrier frame;
Fig. 2 is a plan view of Fig. 1;
Fig. 2a is a cross-section of the frame;
Fig. 3 is a diagrammatic vertical longitudinal section of the drying kiln showing the path of the carrier frames and the adjacent delivery and removing devices;
Fig. 4 is a vertical longitudinal section of a kiln chamber comprising two cells;
Fig. 4a is a cross-section of the supporting columns in one position;
Fig. 4b is a cross-section of the supporting columns in the other position;
Fig. 5 shows the mechanisms for lifting and lowering the vertically movable supporting columns;
Fig. 6 is a plan view of Fig. 5;
Fig. 7 is an elevation of a portion of the horizontal pusher arranged beneath the stacks;
Fig. 8 is a plan view of the mechanisms for the rotation of the vertically immobile stacking columns;
Fig. 9 is a plan view of the mechanisms for the rotation of the stacking columns for up-and-down motion;
Fig. 10 is a vertical cross section of a chamber along line 10—10 in Fig. 4;
Fig. 11 is a view of the kiln outlet in the direction of arrow A in Fig. 12;
Fig. 12 is a lateral view of the kiln outlet and the mechanisms for removing, emptying and returning the frames;
Fig. 12a is an elevation of the drive for the top pushers;

Fig. 14 shows the loading device viewed in the direction of arrow c;

Fig. 14a shows the delivery device viewed in the direction of arrow c in Fig. 15;

Fig. 15 is a side view of Fig 14, and

Fig 16 is a plan view of Fig 15

Figure 10:
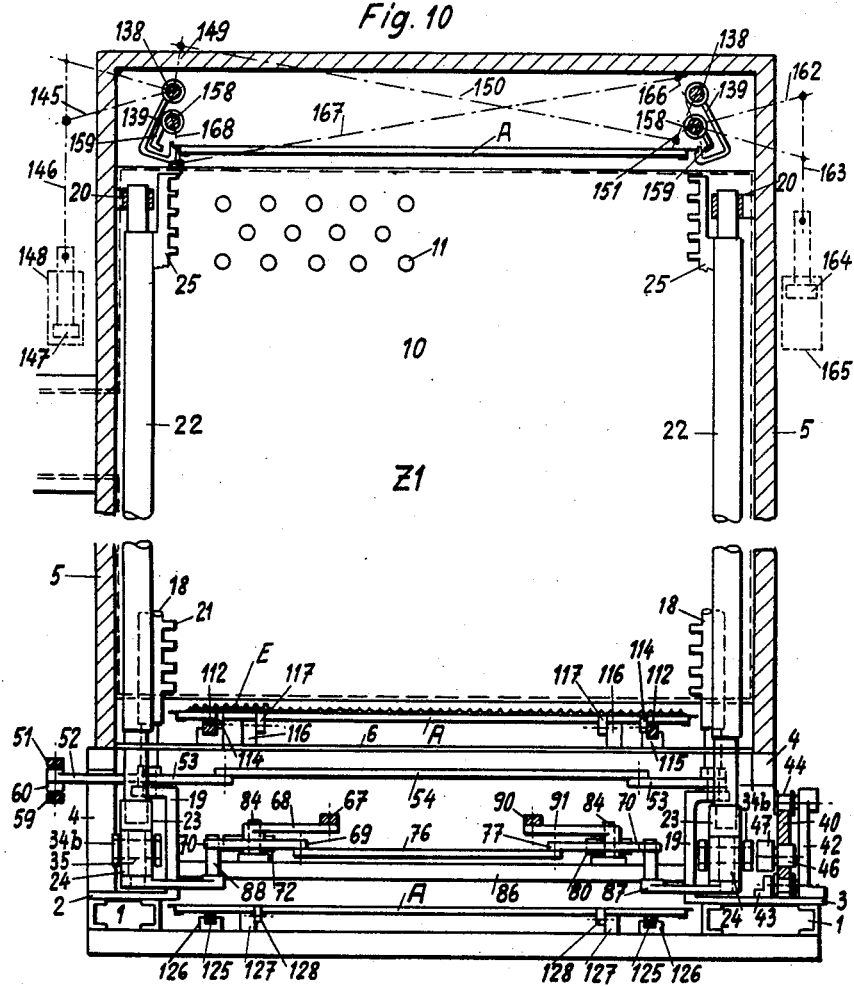

Figs. 1, 2 and 3 show a transport frame A. It comprises the longitudinal profile bars $A_1$, the end connecting rails $A_2$ and the corrugated bands or indented rails $A_3$ applied to the profile bars $A_1$, the said bands or rails $A_3$ serving to hold the electrode rods E parallel and separate. The distance between the waves or indentations is determined by the diameter of the electrode rods E to be dried. The bands or rails $A_3$ may, if desired, be interchangeably attached to the transport frames A. This arrangement of the electrode rods E prevents them from engaging laterally and adhering to one another.

The use of such frames having notches spaced differently and serving for the transport of the electrodes E through the kiln enables more electrodes of a small diameter to be passed through the kiln and dried than electrodes of a large diameter, which is impossible with chain conveyers.

Fig. 3 shows the circuit of the transport frames A from the loading point B through the cells $Z_1$-$Z_6$ of the continuous drying kiln to the delivery point G and back to the loading point B. From the loading point B the transport frames A supporting the electrode rods sheathed in a compound still soft pass over a rotating three-arm mechanism C to a horizontal pusher D passing through the entire length of the kiln which pushes them first into cell $Z_1$ of the first chamber where they are stacked by a stacking device. When the stack of transporting frames has reached a predetermined height, the top frame is passed into cell $Z_2$ of the first chamber by pushers F and $F_1$ which also pass through the entire length of the kiln.

With the downward movement, a stack is formed in this cell $Z_2$ until the bottom frame reaches the range of pusher D of which the dog passes it into the cell $Z_3$ of the next following chamber etc. The process is repeated until the transporting frames A are conveyed, by pusher D, to the rotating three-arm mechanism L to discharge the electrode rods E on the frames to the unloading point G, whereupon the empty frames A are returned to the loading point B by means of pushers N.

Rigidly attached to the base frame (Fig. 4), with the base plates 2 and 3 (Fig. 10), and the supporting structure 4, is the insulated kiln housing 5 and the base plate 6. Between each two spaced apart blow channel members 7 having air outlets 8 is located and defined a chamber, said channel members being designed to supply hot air which is blown between the stacked frames through air openings 9. A suction duct member 10 divides each chamber into cells $Z_1$ and $Z_2$ as depicted in Fig. 4, said duct member being equipped with air openings 11 through which the air is sucked by the exhaust duct member 12 after passing over the electrodes to be dried. A number of such chambers with identical equipment are serially arranged in alignment with each other to form a continuous drying kiln as shown in Fig. 3. To the last chamber or chambers respectively, of the kiln cold instead of hot air is supplied to cool the electrodes.

The conveying means supplying the frames to the kiln and removing it therefrom, and the devices for stacking the frames A and removing them from the said stacks in the cells of the kiln are below described in conjunction with Figs. 4 to 16.

A chamber comprises two cells $Z_1$ and $Z_2$ through which the frames move in the vertical direction. The frames pass the first cell from bottom to top, the second, from top to bottom. In a kiln having e.g. three chambers, the cells with rising frames are numbered $Z_1$, $Z_3$ and $Z_5$, the cells with descending frames $Z_2$, $Z_4$ and $Z_6$ (Fig. 3).

The following description of cells $Z_1$ and $Z_2$ and their equipment applies, mutatis mutandis, to cells $Z_3$, $Z_4$, $Z_5$ and $Z_6$ etc.

Supported below by brackets 19 and held in bearings 20 above are four rotatable columns 18 in cell $Z_1$. In the range of the path of the frames A, the columns 18 are equipped with supporting fingers 21.

The four columns 22 with the rigidly connected journals 23 are rotatably held by beam 24 below and by the bearings 20 on top. In the range of passage of the frames A, the columns 22 are provided with supporting fingers 25 having lateral abutments 25a which are designed to move and horizontally to guide the frames A.

In cell $Z_2$ the four rotatable columns 26, of which the design is exactly similar to that of columns 18, have their lower ends supported by brackets 27 while their upper ends are guided in bearings 28. In the range of the passage of the frames A, the columns 26 are also equipped with supporting fingers 29.

The four columns 30 in cell $Z_2$ with the rigidly connected journals 31 correspond to the columns 22 and are rotatably held at the bottom by beam 32 and by bearings 28 at the top. In the range of passage of the frames A, the columns 30 are also provided with supporting fingers 33 having lateral abutments 33a, which are designed to ensure vertical movement and accurate horizontal guiding of the frames A.

The beams 24 and 32 are supported by a rocker 34, Figs. 4, 6 and 9, which is held in bearings 48 arranged in the centre below a chamber. It is formed with four arms 34a having forks 34b of which two extend into cell $Z_1$ and two into cell $Z_2$. Movably supported by means of pins 35 in these forks 34b are the beams 24 and 32. If the rocker performs a limited rotary movement, the columns 22 and 30 will perform a vertical movement.

The rocker is driven by a hydraulic cylinder 36, Figs. 5, 6, with a piston 37; the ends of the two piston rods 38 and 39 hold control plates 40 which perform a reciprocatory motion. In a kiln having more than two chambers, the further control plates 40 are connected with the control plate 40 in the next following chamber by means of a rod.

The control plate 40 is held in the bearings 42, 43, Figs. 6, 10, by means of rollers 44 and equipped with a slot 45 inclined relative to the horizontal plane, which slot is engaged by a roller 46 attached to a lever 47. The lever is rigidly connected with the rocker 34, Fig. 6.

The four columns 18, Fig. 8, are rotated by the piston 50 of the hydraulic cylinder 49 which actuates the lever 52 via rod 51. The said lever 52 is attached to the left-hand rear column 18. The lever 53 connected with lever 52 transmits the movement to the left-hand column 18 of the opposite side of the kiln via rod 54 and lever 55, while the toothed segments 56, Figs. 8 and 4, transmit the movement to the adjacent columns 18. Rod 51 connects all levers 52 of the cells $Z_1$ in which the frames rise.

The rotary motion of the four columns 26 in cells $Z_2$ is produced by the piston 58 of the hydraulic cylinder 57, Figs. 8, 10, which piston actuates the lever 60 via rod 59. The said lever 60 is arranged on the left-hand rear column. Lever 61 is connected with lever 60 and transmits the movement to the left-hand column at the opposite side of the kiln via rod 62 and lever 63, while the toothed segments 64 transmits the movement to the adjacent columns. All levers 60 of the cells $Z_1$, $Z_3$, $Z_5$ etc., in which the frames descend, are connected with rod 59.

The columns for up-and-down motion 22, Fig. 9, of cell $Z_1$ are rotated by the piston 66 of a hydraulic cylinder 65. The piston 66 actuates lever 68 via rod 67. The said lever 68 is rigidly connected with lever 69 and angle lever 70 one end of which is provided with a slot 71 while the other leg carries the toothed segment 72. The latter engages the adjacent toothed segment 74 on angle lever 73 which has its other leg again provided with a slot 75. Movement of lever 69 is transmitted, via rod 76, to lever 77 which is rigidly connected with angle lever 78. Angle lever 78 again has one leg provided with a slot 79 and the other with the toothed segment 80, which transmits the movement to toothed segment 82 on angle lever 81.

The journals 84 on which the four angle levers 70, 73, 78 and 81 are supported, are arranged on the base plates 85 which are rigidly attached to the traverses 86, Figs. 4, 9, 10. Slots 71, 75, 79 and 83 are each engaged by a pin 88 of the four levers 87, which are rigidly attached to the journals 23, Fig. 4, of the columns 22. Connected with rod 67, Fig. 9, are all levers 68 of cells $Z_{1-2-3}$ in which the frames rise. The pins 88 can be vertically displaced in the slots 71, 75, 79 and 83 when the columns 22 are raised or lowered.

The four columns 30 of cells $Z_{2-4}$ etc., which may be raised and lowered, are rotated by piston 89 of a hydraulic cylinder 88a the piston of which actuates lever 91 via rod 90. The lever 91 is rigidly connected with lever 92 and angle lever 93. The angle lever 93 has one end provided with a slot 94 and its other end carries the toothed segment 95 which engages the adjacent toothed segment 97 of angle lever 96 of which the second leg is provided with a slot 98. Lever 92 transmits its movement to lever 100, via the rod 99, which lever is rigidly connected with angle lever 101. The angle lever 101 has one leg equipped with a slot 102, the other leg carries the toothed segment 103 which transmits the movement to toothed segment 105 on the angle lever 104 with the slot 106. The pins 107 holding the four angle levers 93, 96, 101 and 104 are arranged on the base plates 108 which are rigidly connected with the traverses 109. A pin 111 of the four levers 110 engages each of the slots 98, 102 and 106, and the said levers are rigidly connected with the journals 31, Fig. 4, of the columns 30.

Connected with the rod 90 are all levers 91 of the cells $Z_2$, $Z_4$ etc. in which the frames descend.

Transport of the frames in the upward direction within the cells $Z_1$ is performed as follows:

When the conveying mechanism is idle, i.e. until the control mechanism is given a new impulse, the frames rest on the fingers 21, Fig. 8 of the inner columns 18, which fingers are turned inwards, Fig. 8, cell $Z_1$. The fingers 25 of the columns 22 are swivelled out and are at a certain distance from the end connecting rails $A_2$ of the frames A. The columns 22 turn inwards and their fingers 25 move beneath the end connecting rails $A_2$. When the columns 22 rise, the said fingers engage the frames A and lift them to the next following finger of the inner column 18. Meanwhile, the fingers 21 of the inner columns 18 have been opened in order to allow the rising frames to pass, and are then immediately closed again. The outer columns 22 are lowered, each frame being deposited on the next higher finger of the inner columns 18. Then the fingers of the outer columns 22 are opened so that they clear the frames resting on the fingers 21 of the inner columns when the columns 22 are lowered. At the end of the downward movement of the columns 22, their fingers again return to closing position ready for a new operational cycle.

Transport of the frames in the downward direction in cells $Z_2$, $Z_4$ etc. is performed as follows:

When the transport mechanism is in idle position, the frames rest on the fingers 33, which are turned inwards, of columns 30, Fig. 8, which are in their raised position. At the beginning of an operational cycle, the outer columns are lowered with the frames moving past the opened fingers 29 of the inner columns 26, which are closed immediately after the passage of the frame. The frames in downward movement are placed on the next lower fingers 29 of the inner columns 26, while the outer columns drop a little further and their fingers 33 are opened. The outer columns then rise again and close their fingers 33 after passing the frames resting on the fingers 29; during their further movement they lift the frames off the fingers 29 of the inner columns and remain in their top position so that the frames resting on the fingers 33 are lowered in the next operational cycle.

The horizontally reciprocated pushers D, F, and N are designed to effect the movement of the frames in the circuit. They move the frames intermittently into the kiln, from one cell to the next, from one chamber to the next, and out of the kiln. The middle pusher D consists of two pusher rods 112 functionally connected and having the claws 113 and pawls 114, which can be displaced in the bearings 115, Figs. 4, 7, 8, 9 and 10, and the brackets 115a, Figs. 11, 12, 13 bolted to the end of the kiln in such a manner that a displacement from left to right will move the frame A in front of the kiln inlet between the four columns 18 and 22 of the cell $Z_1$ of the first chamber, Figs. 4 and 8, while the bottom frame of the stack in cell $Z_2$ is moved to the supporting plates 116 of cell $Z_3$ which are each equipped with a pawl 117 holding the frame when the pusher bars 112 are moved backwards. If the kiln comprises several chambers, the pusher bars 112 will move the bottom frame of each stack in cell $Z_2$ to $Z_n$ into the next following cells of the next chambers. From the extreme cell of the last chamber, the frames pass to brackets 118, Figs. 11, 12, 12b and 13, hence to one of the arms 209, 210 or 211 of the rotating delivery mechanism L described below, Figs. 3 and 12. The two chains 129 attached to the arms 119, Figs. 12 and 13, of the pusher bars 112 are passed around the guide rollers 121, 122, 123; they are provided to reciprocate the pusher bars 112 as described below.

The bottom pusher N, Fig. 3, is designed to return the frames A from the rotary delivery mechanism L to the feed mechanism C and comprises the pusher bars 125 supplying the empty frames to the kiln inlet for reloading. Sliding in guides 126, Figs. 10, 11 and 12, they convey the frames from one of the arms 209, 210 or 211 of the rotary delivery mechanism L (described later) at the kiln outlet to the two brackets 127, Figs. 12 and 13, which are provided with a pawl 128 securing the frames against backward displacement. The pusher bars 125 are provided with driving pawls 132 at the distance of the pusher travel and draw the frames from one bracket 127 to the other and finally deliver the frame to an arm of the rotary supply mechanism C arranged in front of the kiln inlet. The two pushers 125 are interconnected by traverse 133 at the kiln outlet and the said traverse has one of the chains 132 attached to each end. The chains are passed around guide rollers 135, 136 and 137 as described below, and reciprocate the pusher bars 125. The centre pusher D and the bottom pusher N operate in the same rhythm.

Figure 11:
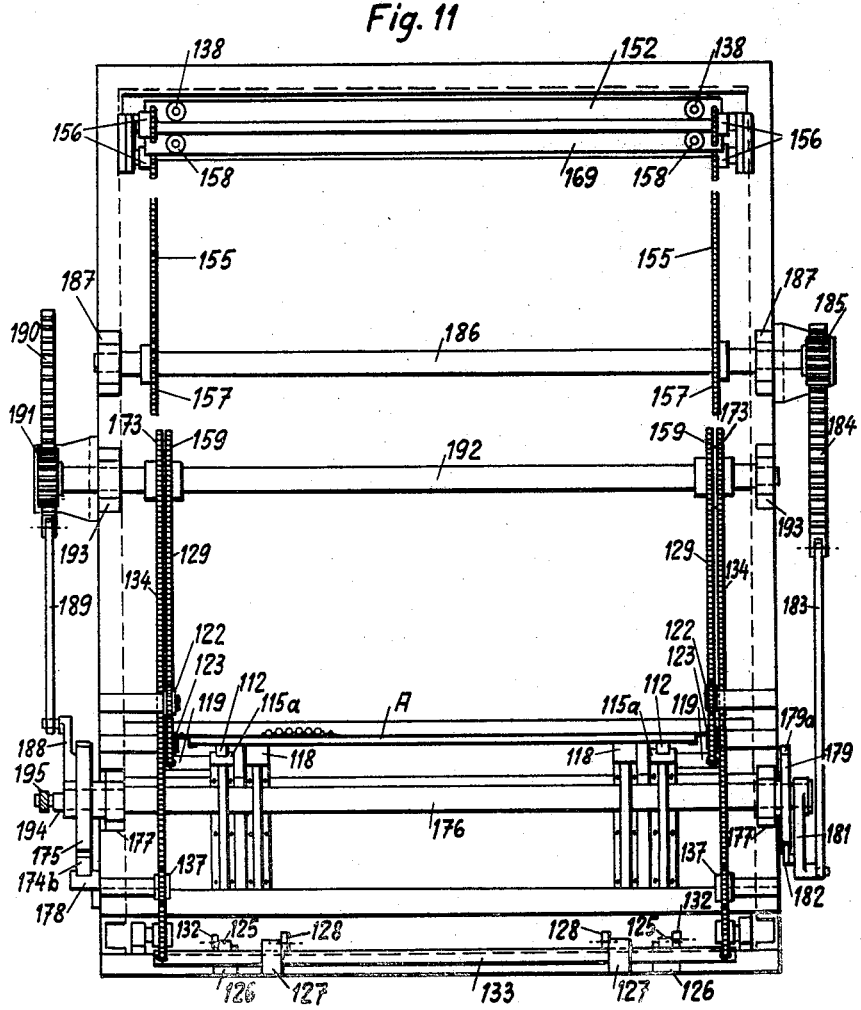
Figure 12:
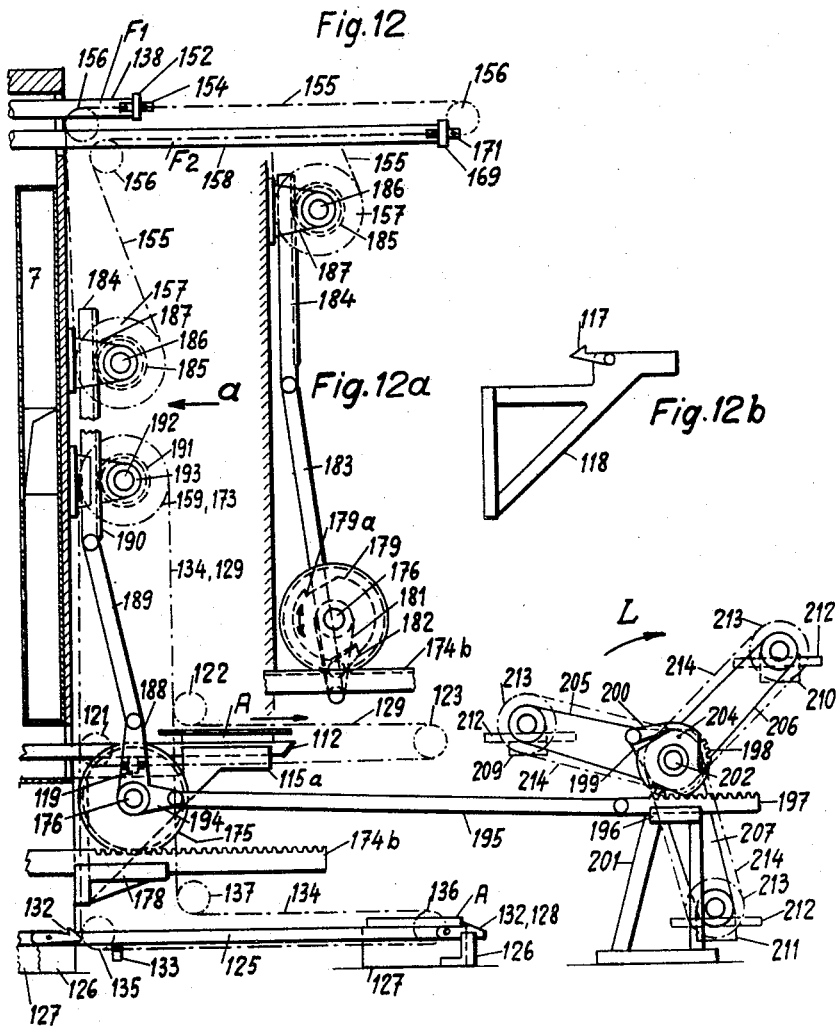
Fig. 12b shows the supporting bracket on which the frames are deposited when pushed out of the kiln.

The top frame of the stack rising in cell $Z_1$ is passed to the descending stack in cells $Z_2$ by two pushers $F_1$ and $F_2$ each being provided with two pusher bars, Figs. 4, 10, 11 and 12. A pusher $F_1$ comprises the two pusher bars 138 which are equipped with claws 139 and guided in bearings 140, Fig. 4. At the beginning of the kiln inlet, the bars 138 are firmly connected with square bars 142 by means of sleeves 141, the said square bars being held in rotating guides 143 in bearings 144. The rotating guides 143 can be rotated by the piston 147 of the hydraulic cylinder 148 by means of lever 145 and bar 146, Figs. 4 and 10. The lever 149 transmits this rotation by bar 150 to lever 151 on the opposite side of the kiln. At the kiln outlet, the pusher bars 138, Figs. 11 and 12, are connected by a traverse 152 and rotatably held in its bores. Attached in the eyes 154 rigidly attached to the traverse 152 are the chains 155 which are passed around guide rollers 156 (as described later) and driven by sprocket wheels 157 to reciprocate the pusher bars 138. The second pusher $F_2$ comprises the two pusher bars 158 with the gripper levers 159 and is guided in bearings 140. At the kiln inlet, the pusher bars 158 are also rigidly connected with square bars 160, Fig. 4, by means of sleeves 141, the said square bars being held in rotating guides 161 in bearings 144. The rotating guides 161 can be rotated by the piston 164 of the hydraulic cylinder 165 via lever 162, Fig. 10 and rod 163. Lever 166 transmits this rotation to bar 158 of the opposite kiln side via bar 167 and lever 168, Fig. 10. At the kiln outlet, the two pusher bars 158 are connected by traverse 169 (Figs. 11 and 12) and rotatably held in its bores. Attached to the eyes 171 rigidly attached to the traverse 169, are chains 155 which are also designed to reciprocate the pusher bars 158.

The top pushers $F_1$ and $F_2$ operate as follows:

The frames A are moved from a rising stack to a descending stack by the two pushers $F_1$ and $F_2$, i.e. by the pusher bar pairs 138 and 158. The pushers operate alternatingly, each performing the same function after the other has effected its operational cycle. If the frames were numbered, the pusher $F_1$ would, by way of example, displace the first, third, fifth etc. frame, pusher $F_2$ the second, fourth, sixth etc. When a frame of a rising stack has reached the top, the gripper levers 139 or 159 move underneath it, displace it from left to right after a standstill of half a cycle and there feed it to the rising fingers of the outer columns. While the gripper levers 139 carrying a frame are displaced from left to right, the levers 159 are open and move from right to left unloaded, and vice-versa.

Figs. 5, 10, 11, 12 and 13 show the drive of the horizontally actuated pushers D, N, $F_1$ and $F_2$ and the rotating mechanisms C and L, Fig. 3. In the hydraulic cylinder 36, Fig. 5, the piston 37 is reciprocated in uniform motion. The control plates 40 are attached to the piston rod 38 on both sides of the cylinder. Extension bars 147a, Fig. 8, and 174b, Fig. 12, are provided at the said control plates. The bars 147a and 174b respectively extending beyond the side walls of the kiln are toothed and the teeth of bar 147a at the kiln inlet engage gear 217 while the rack 174b at the kiln outlet engages gear 175. Gear 217 in Fig. 8 is arranged on shaft 219 held in bearings 218 and designed to drive the rotary supply mechanism provided in front of the kiln inlet, which will be discussed below.

Figure 13:
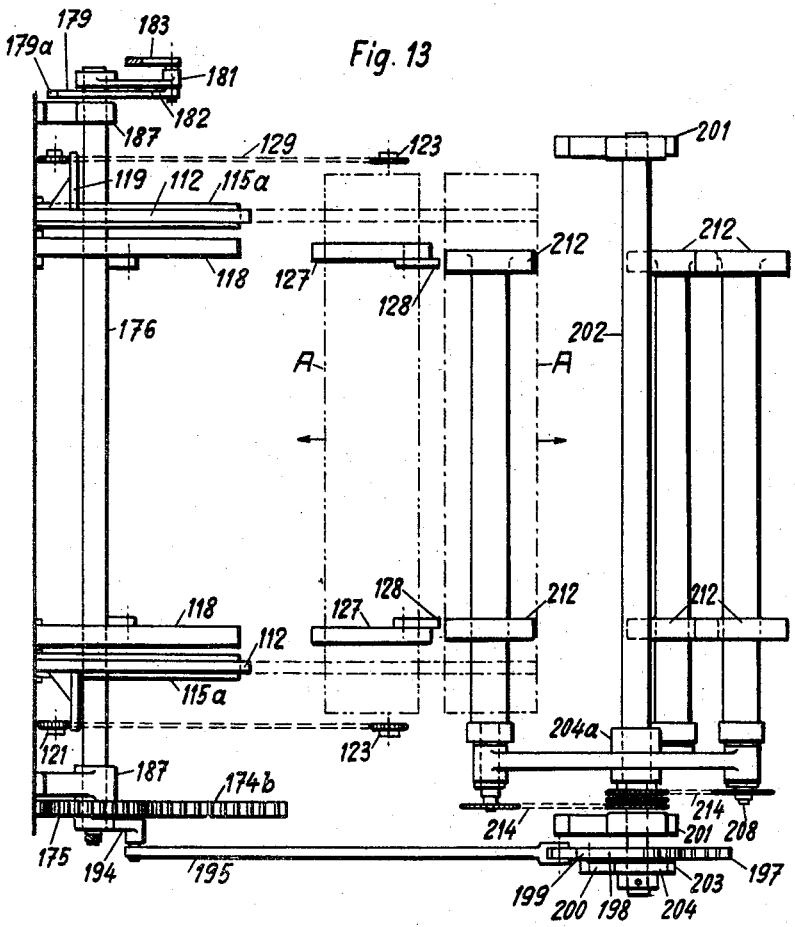
Fig. 13 is a plan view of Fig. 12.

The wheel 175 at the kiln outlet, Figs. 11, 12 and 13, is arranged on shaft 176 supported in bearings 177 bolted to the end wall of the kiln outlet.

The uniform reciprocatory movement of rack 174b causes the shaft 176 to perform a uniform oscillatory motion. Displacement of pushers D, N and F in Fig. 3 must not, however, be uniform but be accelerated and reduced sinusoidally from zero to maximum and back. For this purpose a crank 188, Figs. 11 and 12, is arranged on shaft 176, which drives the rack 190 via pusher bar 189 with sinusoidal acceleration and retardation. The rack 190 engages gear 191 rigidly connected with shaft 192 held in the two bearings 193 attached to the rear kiln end wall. Also rigidly connected with shaft 192 are the two sprocket wheels 159 and the two sprocket wheels 173 which drive the centre and bottom pair of pushers by means of chains 129 and 134. The chains 129 are passed around guide rollers 121, 122, 123 and the ends of the chains are connected with the arms 119 attached to the racks 112.

The chains 134 driving the bottom pushers N pass around the sprocket wheels 173 attached to shaft 192 and their ends are pivoted to the traverse 133 connecting the pusher bars 125. If the driving rack 174b moves from the right to the left, the middle pusher D and the bottom pusher N move from the left to the right and vice versa.

Movement of the two top pushers $F_1$ and $F_2$, each comprising two pusher bars 138 and 158, is performed by a second chain drive. Supported in bearings 187, Figs. 11, 12, 12a, which are arranged on the front wall of the kiln outlet, is the shaft 186 to which two sprocket wheels 157 are keyed. The said sprocket wheels drive the chains 155 which are passed around guide rollers 156. The chains 155 are connected with both the traverse of the pusher bars 138 and the traverse 169 of the pusher bars 158. The pushers $F_1$ and $F_2$ do not perform a continuous reciprocatory movement but move only when the rack 174b moves from the right to the left, and for this reason two pushers $F_1$ and $F_2$ moving in opposite directions are provided. To this end, a crank 181, Figs. 11 and 12a, is keyed to shaft 176, which is rotated by 180° via a pawl 182 which engages one of two opposite driving grooves 179a in the driving pulley 179 keyed to shaft 176. By means of the pusher bar 183 this crank causes the rack 184 to be moved slidably at a rate sinusoidally accelerated and retarded. The rack 184 engages gear 185 which is rigidly attached to shaft 186. Arranged on shaft 186 are the two sprocket wheels 157 which actuate the top pushers $F_1$ and $F_2$ via chains 155, the said pushers moving in opposite directions. When the rack 174b moves from the left to the right, the driving pulley 179 will slide back below the lock pawl 182 empty so that the two pushers $F_1$ and $F_2$ remain idle. During the next cycle, the lock pawl 182 engages the second driving groove 179a.

The devices described below and illustrated in Figs. 14, 14a, 15 and 16 are provided to load and unload the electrode rods E from the frames A, to supply the said frames into the kiln and to remove them from it. The driving means required to coordinate the motions of these devices with the movements of the pushers D and N are shown in Figs. 8, 12 and 13.

The electrodes are supplied and applied to the frame A by a chain conveyer. The sprocket wheels 223 which drive the conveyer chains 221 are arranged on shaft 227 which is driven by motor 230 with a reduction gear via chain 232. These conveyer chains 221 are carried by the frame composed of rails 224 and supports 222, and passed around chain rollers 222. The front portion of the rails 224 projects without transverse connection.

The conveyer chains 221 are advantageously provided with indentations into which the electrode rods sheathed in a compound still soft are placed manually or mechanically. The indentations of the chains are arranged at the same spaced relationship as the grooves of frames A.

Provided for the movement of the frames A to the pusher D and away from it, i.e. into and out of the kiln, are two rotary mechanisms of similar design C and L, Figs. 3 and 12 through 16 of which one, L, arranged at the kiln end will be described below. The crank 194 firmly connected with the shaft 176 transmits a sinusoidally accelerated and retarded reciprocatory motion to the rack 197 guided in bearing 196 via pusher bar 195, Figs. 12 through 16. The rack 197 engages toothed segment 198 connected with lever 199, which carries a locking pawl 200. The toothed segment 198 rotates freely on the shaft 202 guided in bearings 201, Figs. 2 and 15. If the toothed segment moves in the clockwise direction, the pawl 200 engages one of the three grooves 203 of the driving pulley 204 rigidly connected with shaft 202 and turns it by 120° while it is stationary when the toothed segment is moved in the anticlockwise direction. Rigidly attached to the shaft 202 is the hub 204a with three arms 205, 206, 207 in the outer eyes of which the radial supporting arms 209, 210, 211 provided with pivots 208 are rotatably arranged. The said arms 209, 210, 211 have laterally extending supporting members 212 on which the frames rest. To guide these surfaces horizontally, the sprocket wheels 213 attached to the pivots 208 of the supporting arms are connected with the stationary sprocket wheels 215 attached to the bearing 201.

The rotary mechanism provided at the kiln inlet is designed in a similar manner and driven by rack 174a, Fig. 8, attached to the front control plate 40. It drives gear 217 connected with a crank 194a which is identical in design and function with crank 194.

The gear 217, Fig. 8, is rigidly connected with the shaft 219 guided in bearings 218. The pivot 220 of shaft 219 is designed to take up the movement which drives the control shaft (not shown) for the actuation of the valves leading to the hydraulic cylinders 36, 49, 57, 65, 88a, 148 and 165 in a separate hydraulic unit which is not part of the invention.

The function is as follows: During the standstill of the rotary arms, an empty frame A is moved to the members 212, Fig. 14, of the supporting arm 211, in lowered position, of the rotary mechanism C of the kiln inlet by means of pusher N and at the same time the conveyor chains 221 moving in the direction of the arrow in Fig. 15 place the number of electrodes necessary for a frame load in feed position.

The supplying mechanism C then turns by 120° the frame A extending between the chains 221 from below so that the electrode rods E resting thereon enter the indentations of the frame and are lifted off by the chains. When the rotary mechanism is at its next standstill, the pusher bars 112 move below frame Aa and withdraw it from the members 212 by means of their locking pawls 114. This process is repeated whenever the rack 174a moves in one operational direction.

The same device L, Fig. 14a, is arranged at the kiln outlet. When the delivery mechanism is stationary, the pusher bars 112 of pusher D supply a frame A with dried rods to the supporting arm 209. During the next following rotation of supporting arm 209, the latter lifts frame A from the pusher D which at the same time begins its return motion. Supporting arm 209 swivels between the chains 221 together with the frame A, the electrode rods E lifting off the frame and resting on the chains. The chains at the delivery mechanism L move in the direction of arrow b, Fig. 15, and remove the rods. At standstill after the next following rotation of the supporting arms, the bars 125 of the pusher N move beneath the frame and withdraw it from the member 212 by means of the driving pawls 132.

Having now particularly described and ascertained the nature of my said invention and in what manner the same is to be performed, I declare that what I claim is:

1. A kiln for treating sheathed welding electrodes, wherein said kiln has an inlet and an outlet; comprising a kiln housing, a plurality of separate conveyor frames for supporting said electrodes, a plurality of channel members in said housing partitioning said housing into serially arranged chambers through which air flows, a duct in each of said chambers dividing each chamber into two cells of which a first cell is provided with first means for stacking said frames on a rising stack by placing each frame successively below said rising stack and operating means for raising said frames in a rising stack, and of which a second cell is provided with second means for lowering the frames in a descending stack and operable means for successively removing the lowermost frame of said descending stack, and at least three superposed horizontally movable pushers mounted in said kiln, the center pusher of said pushers extending below all of said stacks and below said channel and duct members and for moving said frames into and through the kiln from the descending stack of one chamber to the rising stack of the next chamber and then out of said kiln, the upper pusher of said pushers extending above all of said stacks for removing the top frame from each of said rising stacks within the kiln to place said top frame on the top of each of said descending stacks, the bottom pusher of said pushers being positioned below said chambers for returning treated frames from said outlet to said inlet.

2. A continuous kiln according to claim 1, wherein said rising stack and said descending stack and said operating means and said operable means include eight columns having supporting fingers, four of said columns being rotatable only and designed to hold said frames, the other columns being rotatable and being raised and lowered to convey said frames from said fingers of said four columns to the next successive fingers, and rockers connected to said other columns to raise and lower said other columns.

3. A continuous kiln according to claim 1, including a chain conveyor arranged in front of said inlet for supplying frames loaded with electrode rods to be dried, a drive associated with said center pusher and having a rotary mechanism between said chain conveyor and said inlet and including a shaft and three radial rotatable arms mounted for rotation on said shaft and having laterally extending supporting members for holding the frames in horizontal position, said arms swivelling between said conveyor and said first means for delivering frames successively to said rising stack.

4. A continuous kiln according to claim 3, including means pivotally connecting said members to said arms so that said members are maintained always in horizontal position during rotation of said rotary mechanism.

5. A continuous kiln according to claim 1, including a chain conveyor arranged adjacent said outlet for receiving frames loaded with electrode rods after drying, a rotary mechanism located between said chain conveyor and said outlet and having three radial rotatable arms and a shaft about which said arms are mounted for rotation, said arms having laterally extending supporting members for holding said frames in horizontal position, said arms swivelling between said outlet and said conveyor for delivering frames to said conveyor.

References Cited in the file of this patent
UNITED STATES PATENTS

| | | |
|---|---|---|
| 1,515,851 | Ferm | Nov. 18, 1924 |
| 1,695,224 | Besta | Dec. 11, 1938 |
| 2,620,918 | Fallon | Dec. 9, 1952 |